United States Patent

Helma et al.

[11] Patent Number: 5,774,045
[45] Date of Patent: Jun. 30, 1998

[54] ARRANGEMENT FOR DETECTING OBJECTS IN A REGION TO BE MONITORED

[75] Inventors: Hans Helma, Karlsruhe; Bodo Lübbe, Pfinztal, both of Germany

[73] Assignee: Siemens Aktiengesellschaft, Munich, Germany

[21] Appl. No.: 776,461

[22] Filed: May 19, 1997

[30] Foreign Application Priority Data

Jul. 18, 1994 [DE] Germany .......................... 94 11 602 U

[51] Int. Cl.$^6$ .................................................. G08B 13/00
[52] U.S. Cl. ............................ 340/436; 340/572; 342/42; 342/361
[58] Field of Search .................................. 340/436, 568, 340/572; 342/42, 44, 361, 362

[56] References Cited

U.S. PATENT DOCUMENTS

| 4,763,361 | 8/1988 | Honeycott et al. ................. 342/45 |
| 5,280,286 | 1/1994 | Williamson ........................... 342/44 |
| 5,568,119 | 10/1996 | Schipper et al. ..................... 340/572 |

Primary Examiner—Edward Lefkowitz
Attorney, Agent, or Firm—Kenyon & Kenyon

[57] ABSTRACT

A transmitter/receiver unit and a reflector unit are installed at opposite ends of a region to be monitored. The reflector unit consists of a receiving antenna whose signal is sent to a surface wave transit time element via a Wilkinson divider or a circulator. The signal returned from the latter is sent by the Wilkinson divider or the circulator to an amplifier that supplies a transmitting antenna, which in turn sends the signal back to the transmitter/receiver unit. Objects in the field of the beam cause a change in amplitude of the reflected signal, so the object can be detected with the help of an analyzer unit, namely an amplitude discriminator in the simplest case. The signals may be pulsed radar signals. It is advantageous, however, to use frequency-modulated signals corresponding to FMCW radar, so the frequency difference between the transmitted and reflected signal can also be used as a criterion for objects present in the monitored region in addition to using the amplitude of the reflected signal. The present invention can be used for monitoring railroad crossings.

10 Claims, 3 Drawing Sheets

ARRANGEMENT FOR DETECTING OBJECTS IN A REGION TO BE MONITORED

FIELD OF THE INVENTION

The present invention relates to a system for detecting objects within a monitored area.

BACKGROUND INFORMATION

It is often desirable to determine whether a person is in a hazardous area or whether objects are parked there. For example, this is the case for the area of track between the barriers of a railway crossing. Areas are also monitored for the presence of people for the purpose of safeguarding against intrusion.

It is known from European Patent Application No. 448, 802 that an obstacle in an area to be monitored can be detected by means of a differential image formed from a reference image and a current image. However, this method of detecting objects is subject to great interference caused by weather such as fog or even the time of day.

German Registered Utility Model No. 9,305,611 proposes an arrangement where a transmitter device transmits a high-frequency status inquiry signal through the region monitored to a reflector device consisting of an antenna and a surface wave delay element connected to it by way of an interdigital converter. The surface wave is reflected in this surface wave delay element, sent back to the antenna as an electric signal via the interdigital converter and beamed back to the transmitter device where it is detected by a receiver and sent to an analyzer unit. If an object is in the field traversed by the beam within the monitored region, the reflected signal will be attenuated. The analyzer unit detects the resulting change in amplitude and delivers a status signal. Several surface wave elements can be used, also with different delay times, so the region monitored can be broadened and the object can be located. The signals reflected by several identical surface wave delay elements can be superimposed additively or by subtraction. Problems occur with this known arrangement when the status inquiry signal is reflected back not only by the reflector device but also by other more remote objects such as metal-faced buildings, metal gates, etc. If these objects are such a distance away from the transmission device that the signal transit time is the same as that of the signals reflected on the reflector device, and if the signals reflected on such objects have approximately the same amplitude as those reflected on the reflector device or an even greater amplitude, it is no longer possible to detect obstacles in the region monitored.

SUMMARY OF THE INVENTION

The object of the present invention is to create an arrangement with which objects in a monitored region can be detected more reliably than with the known devices.

More specifically, the present invention is directed to an arrangement for detecting an object in a region to be monitored with a transmitter device that directs a status inquiry signal at a reflector device with a transit time element that is installed on the opposite side of the region to be monitored with respect to the transmitter device and reflects the signals received from the transmitter device, after a period of time determined by the transit time element, to a receiver unit which is arranged on the opposite side of the region to be monitored with respect to the reflector device. The receiver unit is connected to an analyzer unit that analyzes the received signals with regard to transit time and/or amplitude according to analysis specifications. The reflector device of the arrangement of the present invention has a reflector receiving antenna whose signals are sent to the transit time element via a directional separating filter that sends the signal returning from the transit time element to an amplifier that supplies a reflector transmitting antenna. The coupling between the reflector transmitting and receiving antennas is smaller than the gain of the amplifier. It is important for the amplifier gain to be lower than the coupling between the transmitting antenna and the receiving antenna of the reflector device so the latter will not vibrate even under unfavorable conditions. This coupling can be influenced by the distance between antennas and/or by the choice of the polarization of the received and transmitted signals and also by mutual shielding. For example, the polarization directions of the signals transmitted and received may be at right angles. A considerable degree of decoupling can also be achieved by circular polarization. This also makes it possible to suppress or differentiate signals reflected directly on objects.

DETAILED DESCRIPTION

Figure 1:
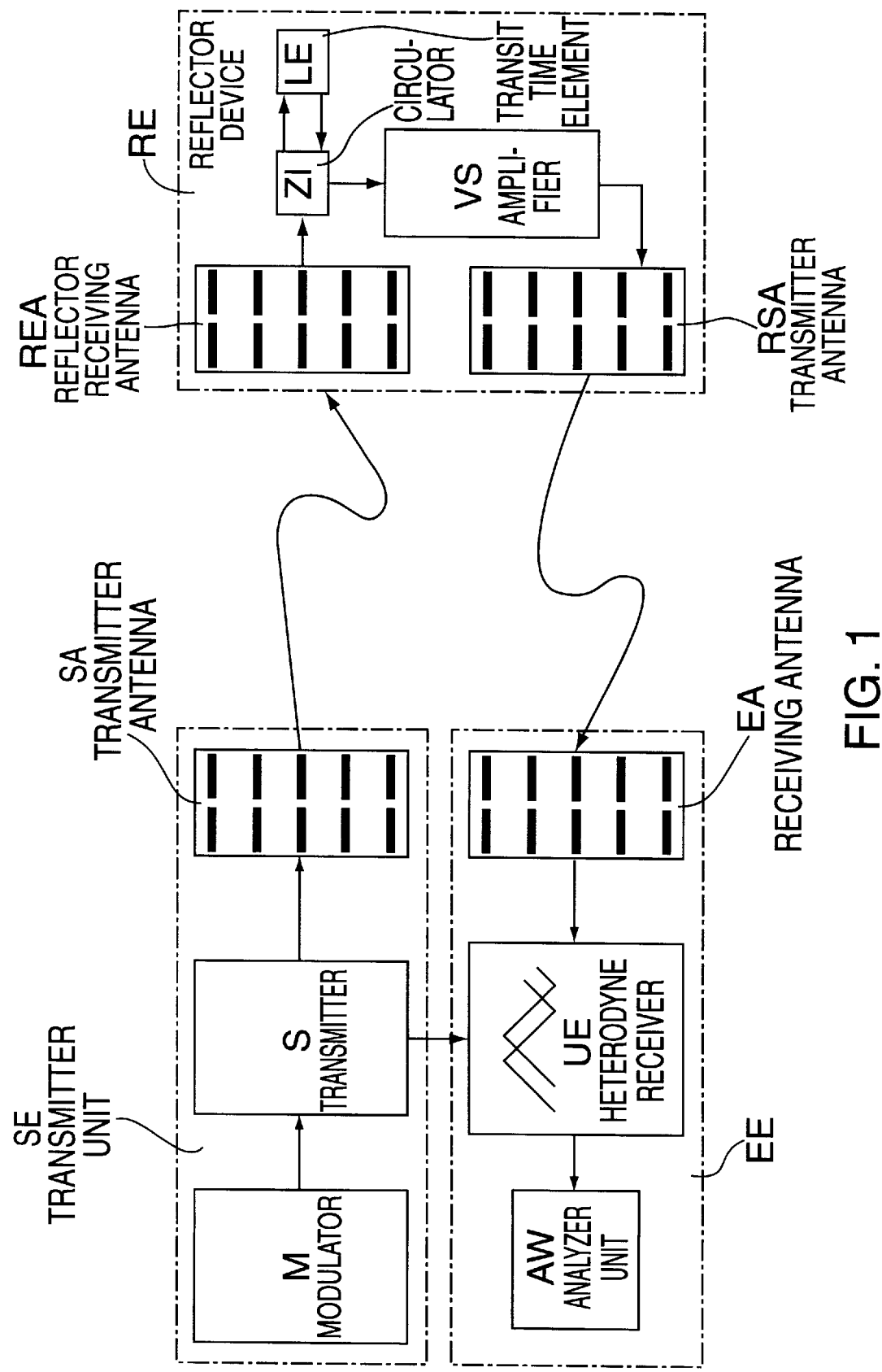
FIG. 1 is a block diagram of an embodiment of a detection system in accordance with the present invention.

In FIG. 1, SE denotes a transmitter unit containing a microwave transmitter. Its frequency is in the conventional frequency range used for radar purposes, namely approximately 2500 MHz in this embodiment. The frequency is modulated by a modulator M with a delta voltage or a saw-tooth voltage. The frequency deviation is approximately 40 MHz in this embodiment. The frequency thus modulated is sent to a transmitter antenna SA, which, in the case of an essentially horizontal region to be monitored, is preferably designed so that its beam has a larger angle in the horizontal than in the vertical plane. The beam of the transmitter antenna SA is aimed at a reflector receiving antenna REA that is part of a reflector device RE. The antenna signal is sent from a circulator ZI or another directional separating filter to a transit time element LE that returns the signal to circulator ZI with a delay of 1–5 $\mu$s. Transit time element LE is preferably a surface wave element with a converter to convert electric signals to acoustic signals and vice versa. The output signal of the transit time element LE is sent from circulator ZI to an amplifier VS that supplies a transmitter antenna RSA that is pointed at a receiving antenna EA that belongs to a receiving unit EE. The signals of antenna EA and transmitter S therefore differ not only in amplitude but also in phase, with the phase shift being determined essentially by the transit time in transit time element LE. Therefore, the phase shift is constant and thus also the amount of the frequency difference between the two linearly frequency-modulated signals is also constant. From the two signals a heterodyne receiver UE forms a differential signal whose frequency is essentially the differential frequency and whose amplitude depends on the intensity of the beam received by receiving antenna EA. The signal of the heterodyne receiver is preferably sent through a filter whose transmission frequency is tuned to the differential frequency. The amplitude of the transmitter S is constant. If an object enters the monitored fields between antennas SA, EA or RSA, EA, the radiation is attenuated and the amplitude drops. Since an object in the boundary area of the beam fields can also cause an increase in the radiation received, an analyzer unit AW, which is essentially an amplitude discriminator, is designed to deliver a status signal when the amplitude of the differential signal is below a threshold level or exceeds another higher threshold level.

In order for the reflector unit RE not to oscillate, the gain of the amplifier VS must not be greater than the coupling between antennas RSA, REA. On the other hand, the gain should be as high as possible so that reflection on more remote objects will not cause interference. Therefore, an attempt is made to minimize the coupling through a suitable spatial arrangement of the two antennas or by different polarization of the beams. At the same time, this has the advantage that a beam reflected on passive reflectors can be differentiated from a beam reflected on reflector unit RE. The two polarization directions are preferably perpendicular to each other. A further improvement can be achieved by using circular polarization because it changes its direction of rotation when reflected on an obstacle.

Only signals reflected by reflector unit RE are analyzed with the arrangement described so far. In addition, the beam received by direct reflection on objects in the path of the beam can also be analyzed. From this, heterodyne receiver UE forms signals whose frequency is a measure of the distance of the objects from the transmitter unit SE.

The embodiment described here operates according to a continuous-wave radar process. Instead of this, however, pulsed radar may also be used. Then the pulses, whose transit time is determined by the distance between the transmitter and reflector units and the delay time of transit time element LE, are analyzed. Of course, direct reflection on objects in the region monitored can also be analyzed when using pulsed radar.

When using pulsed radar, decoupling of the two antennas of the reflector unit can also be achieved by the fact that the receiving antenna is separated from the circulator ZI while pulses are being delivered by amplifier VS. Then it is even possible to use just one antenna on the transmitter/receiver unit end as well as on the reflector unit end, in which case each antenna is alternately used as a transmitting antenna and as a receiving antenna.

Figure 2:
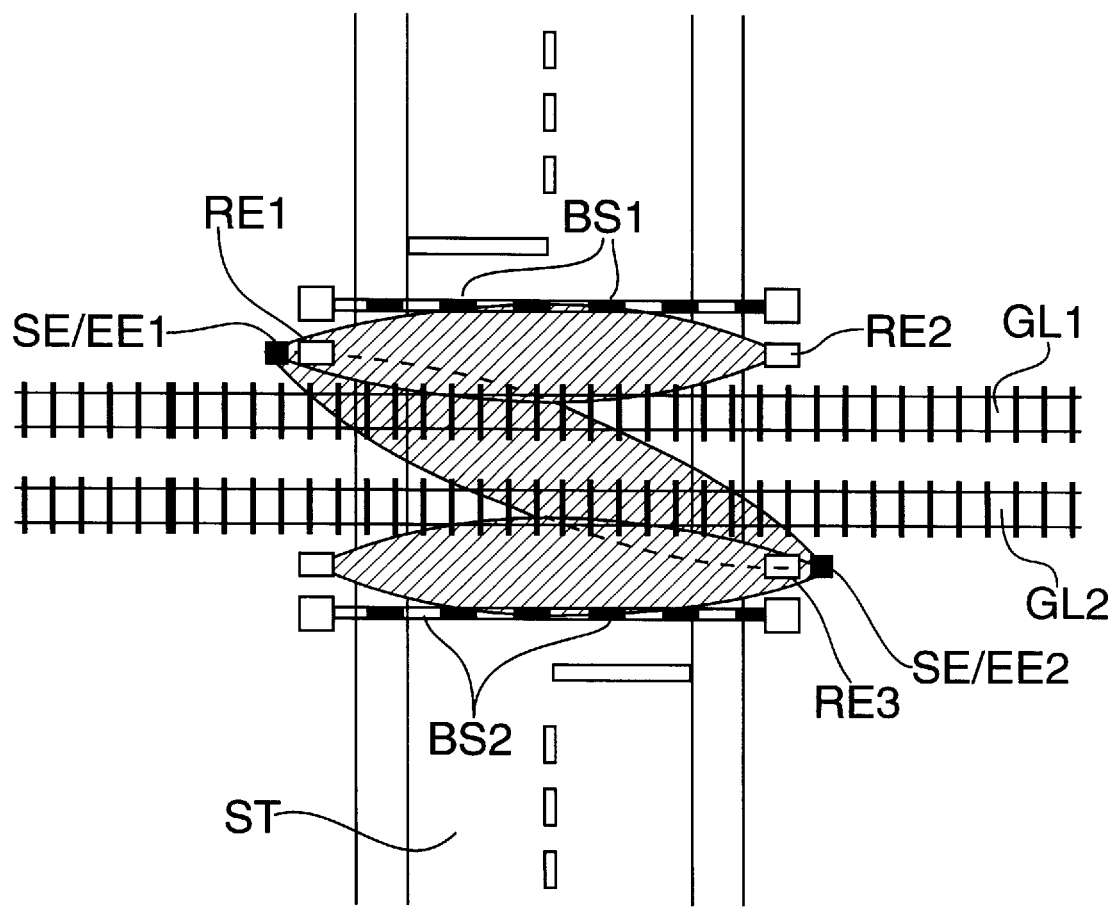
FIGS. 2 and 3 illustrate exemplary configurations of the system of the present invention.

FIG. 2 shows a possible method of monitoring a railway crossing with arrangements according to FIG. 1. GL 1 and GL 2 denote two tracks that cross a road ST, which can be blocked with two pairs of half-way barriers BS1, BS2. Before closing, it must be ascertained that no people or objects such as stalled motor vehicles are in the area of the railway crossing. A first transmitter and receiver unit SE/EE1 of the type described with reference to FIG. 1 is mounted in one corner of the region to be monitored. It interacts as described above with two reflector units RE2, RE3 mounted on the opposite end of the region to be monitored. A second transmitter and receiver unit SE/EE2, which preferably operates at a different frequency than the first, is positioned diagonally opposite the first with respect to the region monitored. It works together with two reflector units RE1 and RE4. The beam fields of the interacting transmitter/receiver units and reflector units within which objects are detected have the cross-sectional shape of an ellipse (first Fresnel zone). Therefore, the entire region to be monitored can be covered by a suitable arrangement of just a few units. As demonstrated here, several reflector units may be present for each transmitter and receiver unit SE/EE. Their transit time elements may have the same delay time. However, different delay times are more advantageous. The differential signal of the heterodyne receiver of the receiver unit has a characteristic frequency for each reflector unit so that, on the one hand, the readiness of each reflector unit is always being checked while, on the other hand, the objects can be located in the region monitored.

Arrangements other than the one shown in FIG. 2 are of course also possible. For example, the transmitter units can be spatially separated from the receiver units, so it is possible, for example, to install the transmitting antenna of a transmitter unit at one corner of the region monitored and to install the respective reflector receiving antenna at the opposite corner, while the reflector transmitter antenna is located at a third corner, connected by a cable laid under the track, and finally the receiver antenna is installed at the fourth corner, where the transmitter and receiver units are again connected by a cable laid under the track.

Figure 3:
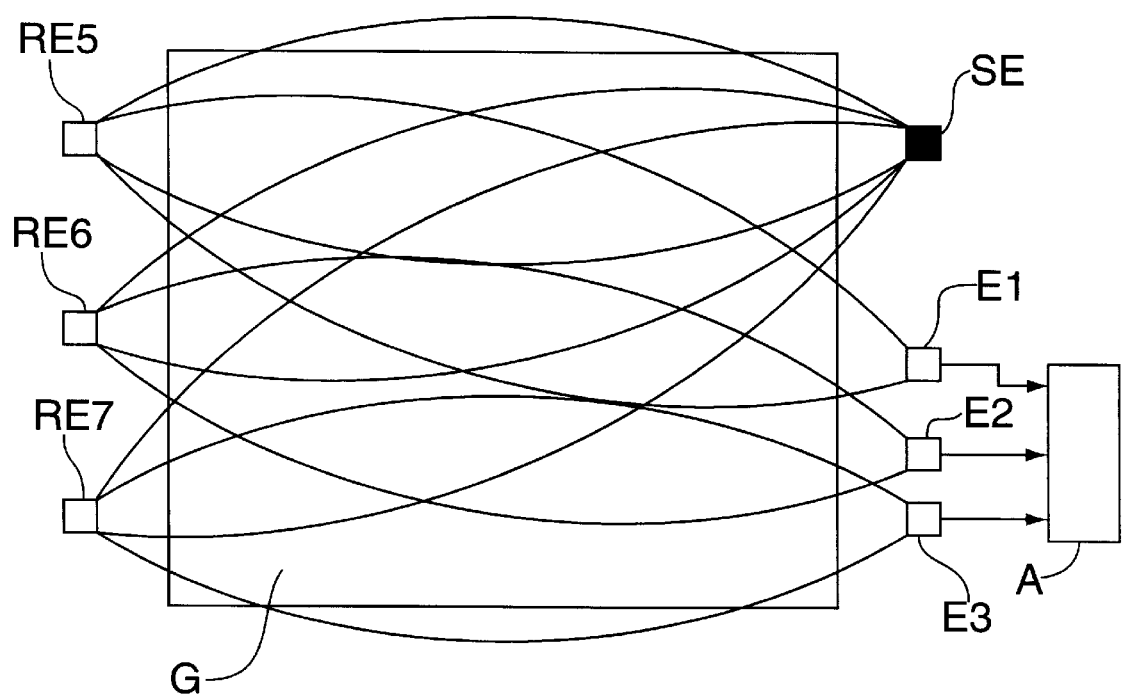

FIG. 3 shows an arrangement for monitoring a rectangular region G with just one transmitter SE but a plurality of receivers E1, E2, E3. The transmitter is directed at three reflector units RE5, RE6, RE7 that are installed on the side of region G opposite the transmitter. The beam reflected by the transmitter is received by three receivers E1, E2, E3 which are operated at the same frequency, in contrast with the receivers in the arrangement according to FIG. 2. If the transmission frequency is modulated, as described above, the oscillators of the receivers must be modulated in synchronization or the transmitter signal will be superimposed on the received signals. As described with reference to FIG. 1, receivers E1, E2, E3 each contain an analyzer unit whose signals are combined in unit A. In the simplest case, this is an OR element which delivers a status signal if at least one of the receiver units generates a status signal. The status signals of transmitter and receiver units SE/EE of the arrangement according to FIG. 2 can also be similarly combined.

In order for all receiving units to have the same response sensitivity, the transmission power can be reduced slowly, preferably periodically, when starting up operation. Then in an unbalanced state, the receiver units deliver status signals one after the other when the signals are lower than the response thresholds. The balancing can be performed in such a way that first one receiver unit is set at the desired response level and then with periodic reductions in transmission power the response levels of the other units are adjusted so they deliver status signals at the same time.

The function of the arrangement can be monitored by briefly lowering the transmission power to the extent that all transmission links are reported as attenuated in the absence of errors. In the event of an error, at least one receiving device does not deliver a status signal.

As described with reference to FIG. 1, the difference between the transmitted signal and the received reflected signal is formed in the receiver units, and the differential signal is analyzed with regard to amplitude and frequency to detect an object in the monitored region. Instead of this, objects can also be detected by subjecting the received signals or the differential signals to a spectral analysis. Characteristic quantities of the spectrum such as amplitudes and the ratio of amplitudes are compared with normal values. If a deviation of more than a given amount is found, a status signal is delivered.

What is claimed is:

1. A system for detecting an object in a region to be monitored comprising:

a transmitter unit located on a side of the region;

a reflector unit located on a side of the region opposite the side on which the transmitter is located, the reflector unit including a transit time element;

a receiver unit located on a side of the region opposite the side on which the reflector unit is located; and an analyzer unit coupled to the receiver unit, wherein:

the transmitter unit transmits a signal to the reflector unit, the reflector unit reflects to the receiver unit the signal received from the transmitter unit after a period of time determined by the transit time element, the analyzer unit analyzes the signal received by the receiver unit, the analyzer analyzing at least one of a transit time and an amplitude of the received signal, the reflector unit includes a reflector receiving antenna coupled to the transit time element via a directional separating filter which provides a signal returning from the transit time element to an amplifier which drives a reflector transmitting antenna, and a coupling between the reflector receiving antenna and the reflector transmitting antenna is smaller than a gain of the amplifier.

2. The system of claim 1, wherein the signal transmitted by the transmitter unit to the reflector unit has a different polarization than the signal reflected by the reflector unit to the receiver unit.

3. The system of claim 2, wherein the signal transmitted by the transmitter and the signal reflected by the reflector unit are polarized linearly with an angle of 90° relative to one another.

4. The system of claim 1, wherein the signal transmitted by the transmitter and the signal reflected by the reflector unit are circularly polarized.

5. The system of claim 1, wherein the signal transmitted by the transmitter is pulsed.

6. The system of claim 1, wherein the transit time element is a surface wave element.

7. The system of claim 1, wherein:

the signal transmitted by the transmit unit is frequency modulated, the receiver unit forms a differential signal with a frequency difference between the signal transmitted and the signal reflected and having an amplitude that corresponds to an amplitude of the reflected signal, and the receiver unit generates a status signal when the amplitude of the differential signal changes by more than a predetermined amount.

8. The system of claim 7 comprising a plurality of receiver units arranged with a spatial separation between them so that the receiver units receive a reflected beam of the transmitter unit, wherein a heterodyne signal is frequency modulated in the same way as the signal transmitted by the transmitter unit.

9. The system of claim 1, wherein:

a spectral analysis of the received signal is performed in the receiver unit, and a status signal is generated if a characteristic quantity of a spectrum of the received signal differs by more than a predetermined amount from a normal value.

10. The system of claim 1, wherein:

a power of the transmitter unit is altered, a status signal is delivered when operation is error-free, and the system is monitored for the occurrence of a status signal.

* * * * *